(12) United States Patent
Bozmoski et al.

(10) Patent No.: US 7,401,753 B2
(45) Date of Patent: Jul. 22, 2008

(54) EXHAUST CLAMP FOR A MOTORCYCLE

(75) Inventors: Alexander Bozmoski, Brookfield, WI (US); Brian Campbell, Waukesha, WI (US)

(73) Assignee: Harley-Davidson Motor Company Group, Inc., Milwaukee, WI (US)

(*) Notice: Subject to any disclaimer, the term of this patent is extended or adjusted under 35 U.S.C. 154(b) by 1406 days.

(21) Appl. No.: 10/192,169

(22) Filed: Jul. 10, 2002

(65) Prior Publication Data
US 2004/0094674 A1 May 20, 2004

Related U.S. Application Data

(60) Provisional application No. 60/304,235, filed on Jul. 10, 2001.

(51) Int. Cl.
F16L 3/22 (2006.01)

(52) U.S. Cl. .............. 248/68.1; 248/70.1; 248/74.1; 248/316.1; 285/124.1; 403/391

(58) Field of Classification Search .......... 248/68.1, 248/70, 74.1, 74.3, 74.4, 316.1; 285/124.1, 285/124.2, 124.3, 124.4, 124.5, 419, 420, 285/403, 382; 403/391, 396, 389, 398
See application file for complete search history.

(56) References Cited

U.S. PATENT DOCUMENTS

| 3,905,623 | A | * | 9/1975 | Cassel | 285/382 |
| 4,056,273 | A | * | 11/1977 | Cassel | 285/337 |
| 4,261,600 | A | * | 4/1981 | Cassel | 285/148.26 |
| 4,364,588 | A | * | 12/1982 | Thompson | 285/419 |
| 4,463,975 | A | * | 8/1984 | McCord | 285/419 |
| 4,611,839 | A | * | 9/1986 | Rung et al. | 285/367 |
| 4,629,226 | A | * | 12/1986 | Cassel et al. | 285/382 |
| 4,660,862 | A | * | 4/1987 | Cassel et al. | 285/114 |
| 4,813,720 | A | * | 3/1989 | Cassel | 285/419 |
| 5,240,294 | A | * | 8/1993 | Corcoran | 285/373 |
| 5,310,158 | A | * | 5/1994 | Cassel | 248/74.3 |
| 5,464,256 | A | * | 11/1995 | Godeau | 285/26 |
| 5,944,365 | A | * | 8/1999 | Kizler et al. | 285/420 |
| 6,089,624 | A | * | 7/2000 | Cassel et al. | 285/382 |
| 6,123,482 | A | * | 9/2000 | Keller | 403/384 |
| 6,199,921 | B1 | * | 3/2001 | Cassel et al. | 285/424 |
| 6,269,524 | B1 | * | 8/2001 | Cassel | 24/279 |
| 6,435,565 | B2 | * | 8/2002 | Potts et al. | 285/124.1 |
| 6,519,815 | B2 | * | 2/2003 | Cassel et al. | 24/279 |

FOREIGN PATENT DOCUMENTS

WO    WO 88/04006    * 6/1998

* cited by examiner

Primary Examiner—Kimberly Wood
(74) Attorney, Agent, or Firm—Michael Best & Friedrich LLP

(57) ABSTRACT

The invention recites an exhaust pipe clamp for clamping at least two pipes. The clamp includes a band formed to at least partially surround each of the two pipes, the band defining an internal volume. A reaction block is interconnected with the band and disposed substantially within the internal volume. The exhaust clamp also includes a clamping member operable to reduce the internal volume of the band.

20 Claims, 5 Drawing Sheets

EXHAUST CLAMP FOR A MOTORCYCLE

RELATED APPLICATION DATA

This application claims benefit under 35 U.S.C. Section 119(e) of U.S. Provisional Application 60/304,235 filed Jul. 10, 2001.

BACKGROUND OF THE INVENTION

The present invention relates to vehicle exhaust systems, and particularly a clamping mechanism for dual exhaust pipe systems.

Most vehicles include exhaust systems for guiding exhaust gases from a vehicle engine. Such exhaust systems typically include an exhaust pipe for guiding the exhaust gases, and a muffler for reducing noise. The exhaust pipe commonly includes one or more exhaust clamps that support the exhaust pipe and/or muffler relative to the vehicle chassis. Some vehicles include two or more exhaust pipes, with each exhaust pipe typically including an exhaust clamp for supporting the exhaust pipe.

Because the exhaust system of a motorcycle is generally visible, it is important that it, and any clamps, be aesthetically pleasing. To that end, large sweeping curves, chrome plating, and compact fits against the body of the motorcycle are used to increase the visual appeal of the vehicle. These features often require the connection of different pipes with the connecting mechanism often being visible.

In addition to supporting the exhaust pipes, mufflers, and other exhaust components, exhaust clamps can be used to clamp one pipe section to another pipe section. When used in this manner, it is important to achieve an adequate seal between the two pipes.

SUMMARY OF THE PREFERRED EMBODIMENTS

The apparatus of the invention provides an exhaust pipe clamp for clamping at least two pipes. The clamp includes a band formed to at least partially surround each of the two pipes, the band defining an internal volume. A reaction block is interconnected with the band and disposed substantially within the internal volume. The exhaust clamp also includes a clamping member operable to reduce the internal volume of the band.

In preferred constructions two reaction blocks having angled surfaces in contact with one another cooperate with the band to define two lobes. Each lobe substantially surrounds one of the pipes. Operation of the clamping member moves the reaction block angled surfaces against one another to reduce the size of the lobe.

In another embodiment the invention provides an exhaust system including a first outside pipe and a second outside pipe spaced a distance from the first pipe. The exhaust system also includes a first inside pipe having a portion at least partially disposed within the first outside pipe, and a second inside pipe having a portion at least partially disposed within the second outside pipe. A pipe clamp including a band is formed to at least partially surround a portion of the first and second outside pipes. A reaction block is interconnected with the band and disposed between the first and second outside pipes. A clamping member is operable to move the first and second outside pipes into substantial sealing contact with the first and second inside pipes respectively.

DETAILED DESCRIPTION OF THE DRAWINGS

Figure 1:
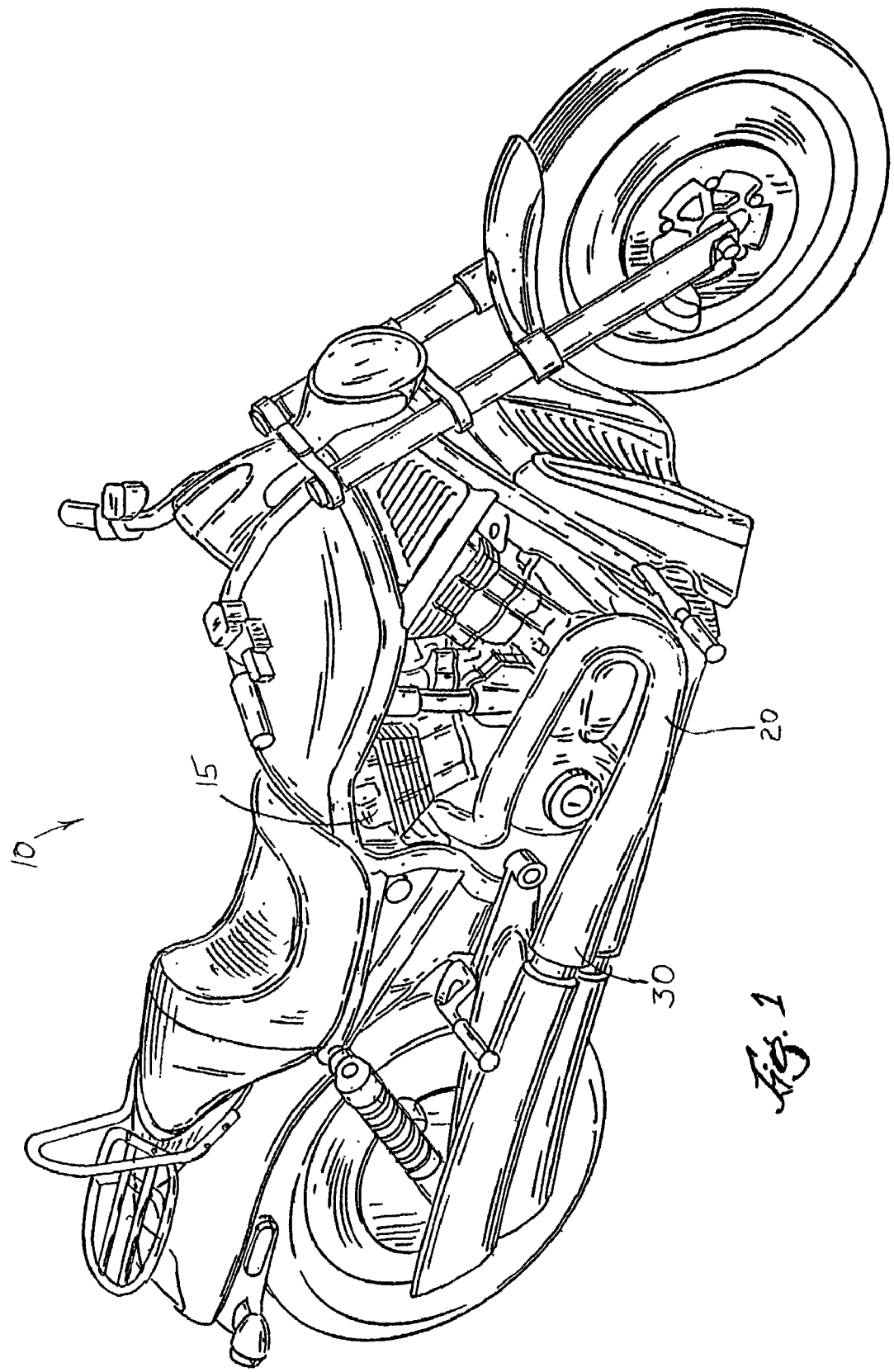
FIG. 1 illustrates a motorcycle having an exhaust system including an exhaust clamp embodying the present invention.

Referring to FIG. 1, a motorcycle 10 is illustrated as including an engine 15 and an exhaust system 20. The engine 15 burns fuel to power the motorcycle 10 and produces exhaust gas as a by-product. The hot exhaust gas passes through the exhaust system 20 and out near the rear of the motorcycle 10. The exhaust system 20 performs several functions including collecting and routing the exhaust gas and quieting the exhaust using a muffler.

Figure 2:
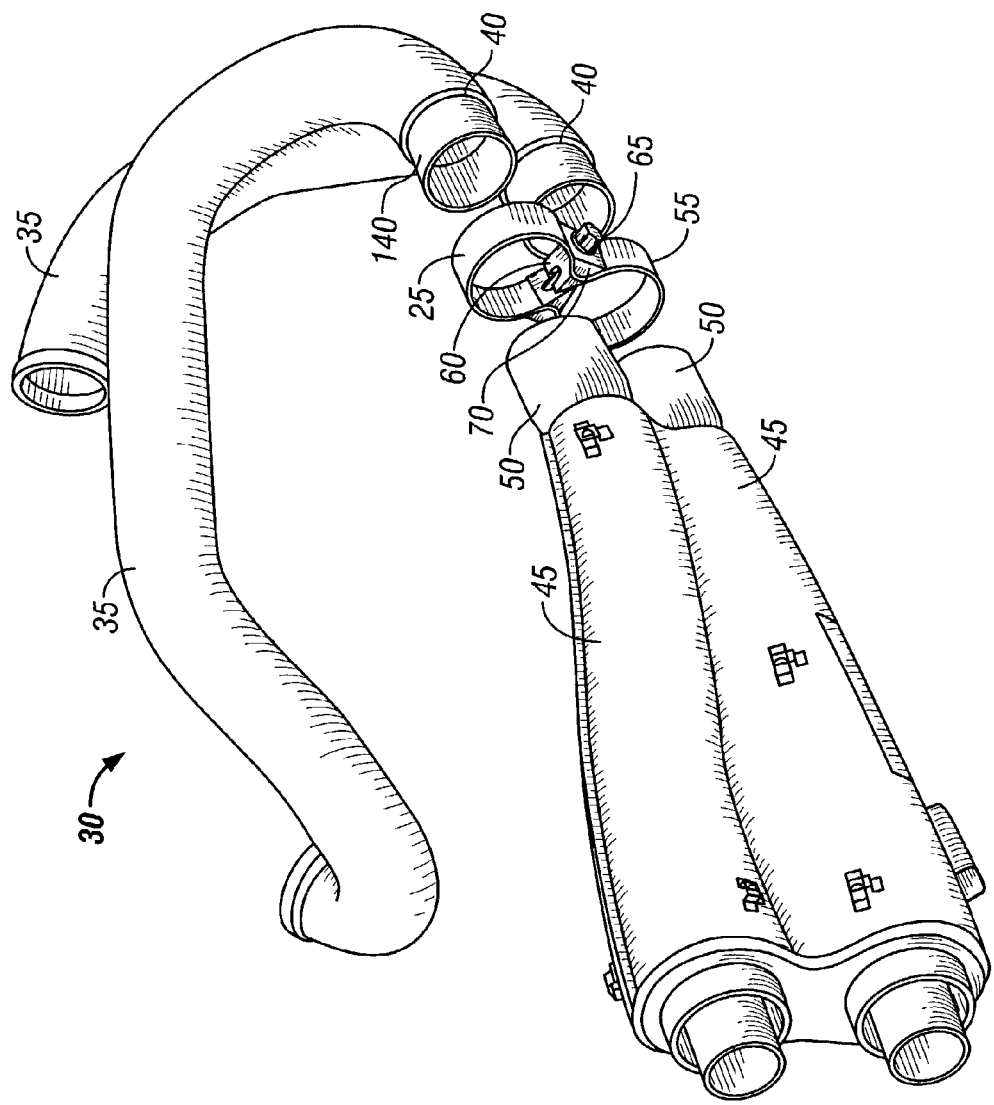
FIG. 2 is a partially exploded perspective view of the exhaust system of FIG. 1.

Referring to FIG. 2, the invention relates to an exhaust clamp 25 that facilitates clamping two exhaust pipes 30 on a motorcycle 10 using a single clamping mechanism. The exhaust pipes 30 include two outside pipes 35 that receive a flow of exhaust gas from the engine 15 at one end and include a joint portion 40 at the opposite end. The exhaust pipes 30 also include two inside pipes 45 that receive the flow of exhaust gas from the outside pipes 35 at the joint portion 40 and discharge the flow to mufflers near the rear of the motorcycle 10. A pipe clamp such as the exhaust clamp 25, illustrated in FIGS. 3-5, connects the outside pipes 35 to the inside pipes 45 adjacent the joint portion 40 and maintains a seal therebetween.

The outside pipes 35 include several bends and curves that position the joint portion 40 of the two outside pipes 35 in a substantially parallel side-by-side relationship. The inside pipes 45 each include a stub portion 50 that is sized to fit inside the outside pipes 35. The stub portions 50 are also positioned in a substantially parallel side-by-side relationship. When the inside pipes 45 are inserted into the outside pipes 35, a lap joint is formed. To seal the lap joint, the exhaust clamp 25 preferably provides a compressive force completely around the two outside pipes 35.

Figure 3:
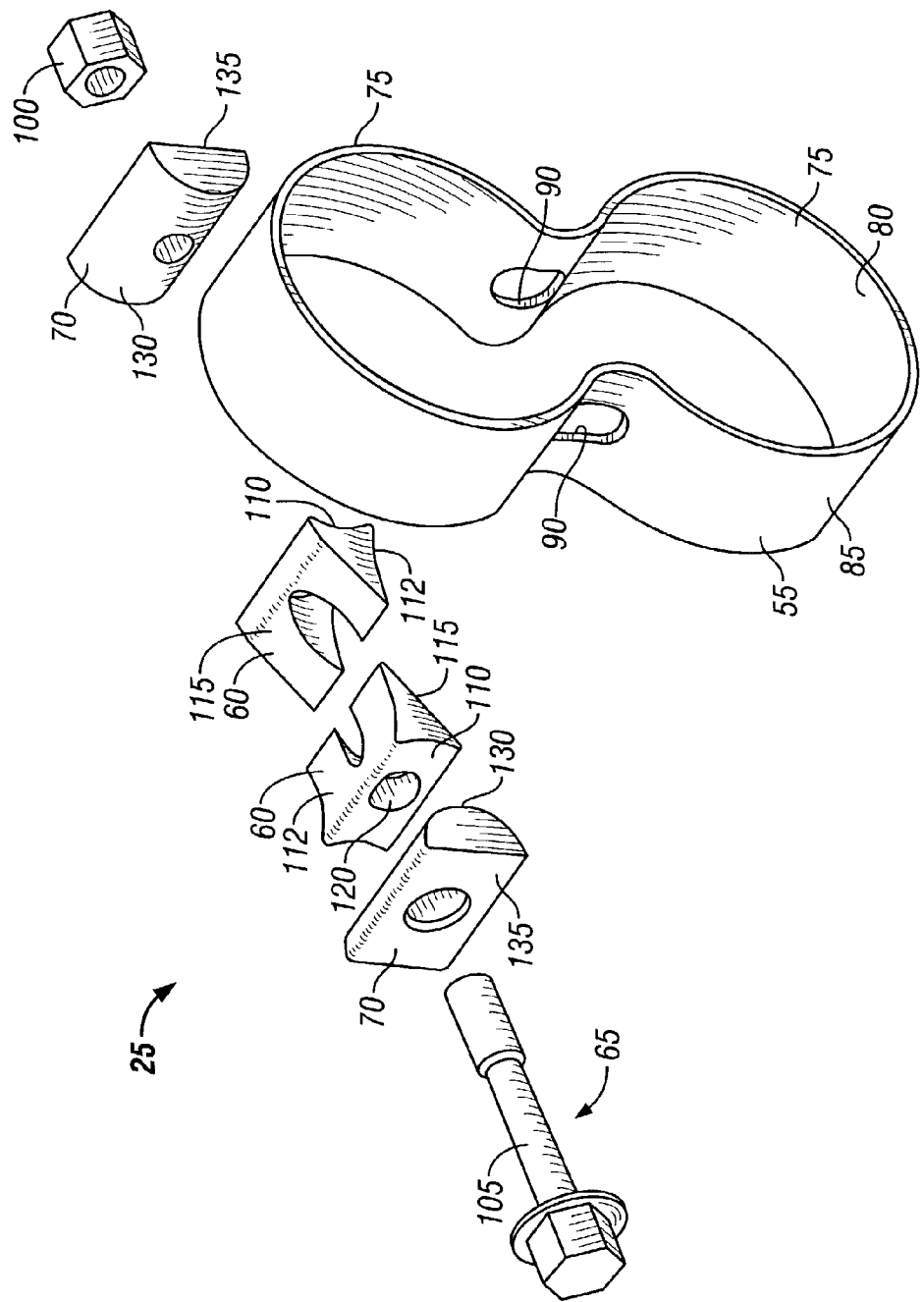
FIG. 3 is an exploded perspective view of the exhaust clamp of FIG. 1.
Figure 4:
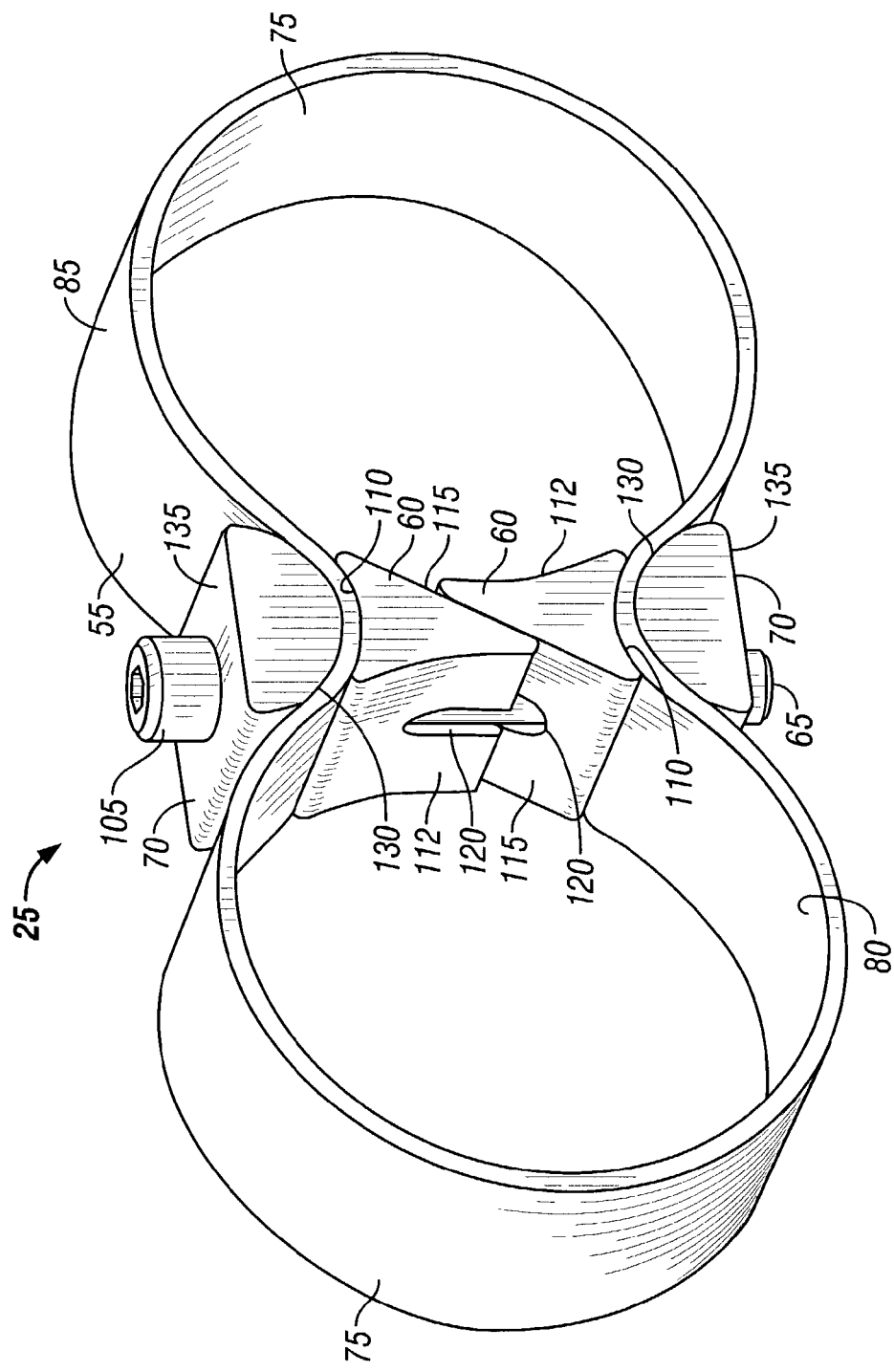
FIG. 4 is an assembled perspective view of the exhaust clamp of FIG. 1.
Figure 5:
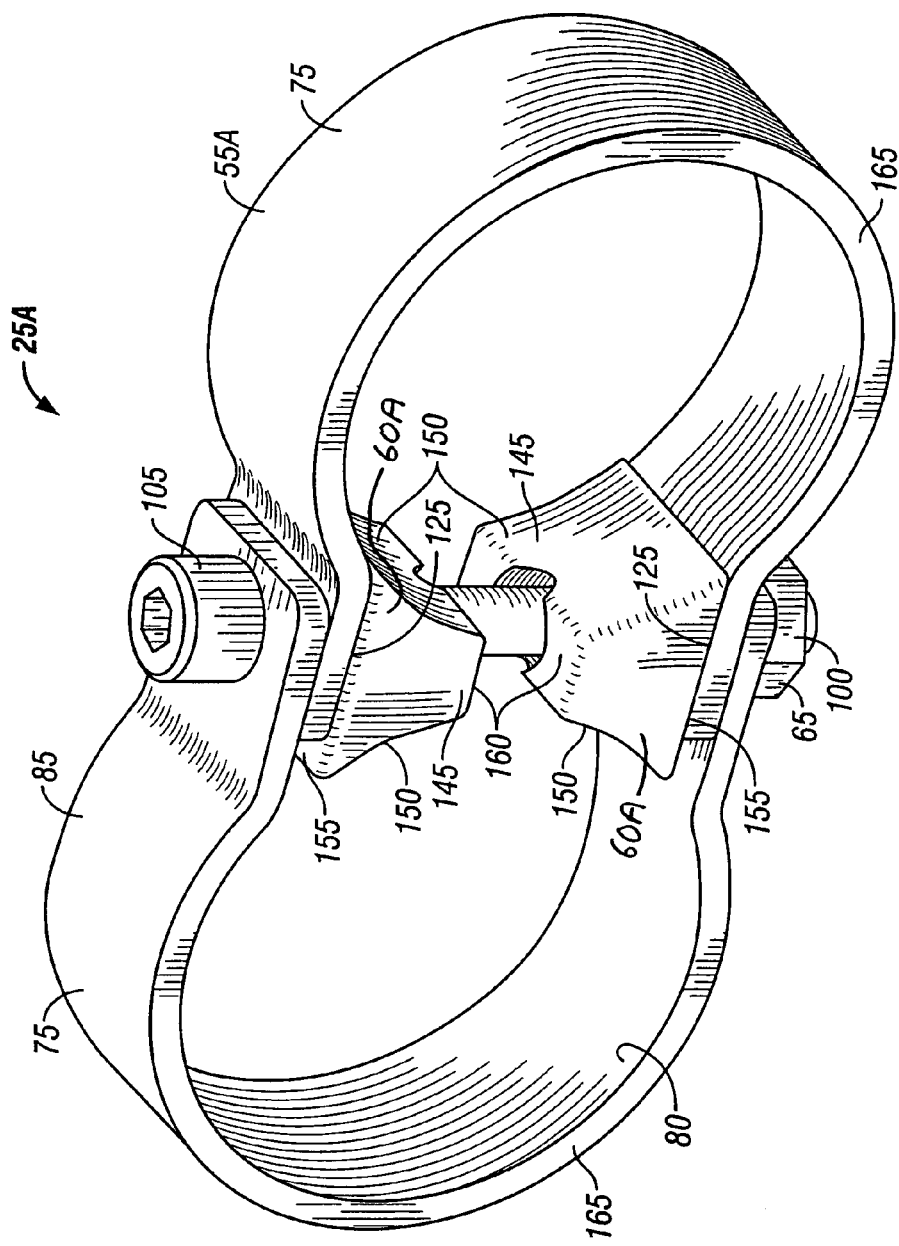
FIG. 5 is a perspective view of an alternate construction of an exhaust clamp.

The exhaust clamp 25, illustrated in FIGS. 3 and 4, includes a band 55, a pair of reaction blocks 60, a clamping member 65, and a pair of washer blocks 70. The band 55 of FIGS. 3 and 4 is a single continuous piece formed into a figure-eight shape to at least partially define two lobes 75, an inner surface 80, and an outer surface 85. The two lobes 75 fit over the two outside pipes 35 such that the band 55 surrounds both pipes 35 and each lobe 75 at least partially surrounds one of the pipes 35. In the relaxed or uncompressed state, the band 55 defines a volume and the size of each lobe 75 allows it to fit loosely over the exterior of the outside pipes 35. Other constructions may use non-continuous bands 55A, such as shown in FIG. 5, or may use bands that are not figure-eight shaped.

In preferred constructions, the band 55 is formed from steel or other metals having suitable properties (e.g., strength, ductility, corrosion resistance, thermal expansion, etc.). Alternative constructions may use ceramics, composites, plastics, or other materials suitable for the application.

The band 55 includes two apertures 90 located in the narrow region between the lobes 75. The apertures 90 are sized to receive the clamping member 65 such that operation of the clamping member 65 narrows the narrow portion of the band 55. The clamping member, such as a nut 100 and bolt 105 as illustrated in FIGS. 3-5, freely passes through the apertures 90 within the band 55 and is operable to compress the lobes 75 and clamp the pipes 35, 45.

Two reaction blocks 60 are positioned within the band 55 to complete the lobes 75 and provide for even clamping of the pipes 35, 45. Each reaction block 60 is substantially wedge-shaped with two arcuate surfaces 110, 112 and one angled or wedge surface 115. An aperture 120 extends through each block 60 and passes through one of the arcuate surfaces 110 and one of the apexes. The arcuate surface 110 containing the aperture 120 abuts the inner surface 80 of the band 55 on either side of the band 55 between the lobes 75 such that the apertures 120 in the reaction blocks 60 align with the apertures 90 in the band 55. The bolt 105 then passes through the band apertures 90 and the apertures 120 within the reaction blocks 60.

The arcuate surface 110 is shaped to provide suitable contact between the reaction block 60 and the inside surface 80 of the band 55. Therefore, any shape surface may be used to accommodate the inside surface 80 of the band 55. For example, the band 55A of FIG. 5 provides a flat surface 125, and the reaction blocks 60A used with the band of FIG. 5 employ a flat surface to achieve the desired amount of contact.

The reaction blocks 60 are positioned in a manner that allows the second arcuate surface 112 of the blocks 60 to abut the outside pipes 35 that pass through the lobes 75 of the clamp 25. The arcuate surfaces 112 are shaped to substantially complete each lobe 75 when in the clamped position and to provide suitable contact between the reaction block 60 and the outside pipes 35. Thus, each reaction block 60 cooperates with the band 55 to substantially surround the outside pipes 35. In an alternative construction, a single block having an hourglass shape replaces the two reaction blocks 60. In still other constructions, the band is oval or racetrack shaped, and the reaction blocks define a larger portion of the lobe 75. Any shape band can be used so long as the inside surface of the band and the reaction blocks cooperate to define two substantially complete lobes 75 suitable for clamping the pipes 35, 45.

The wedge surfaces 115 of the two blocks 60 abut one another. During clamping, the wedge surfaces 115 slide past one another and force the second arcuate surface 112 into the outside pipe 35. The angle on the wedge portion 115 can be varied to provide greater or less force as required by the specific application.

The reaction blocks 60 are preferably made from steel or other metals that have sufficient strength to compress the pipes 35, 45. Alternative constructions may use other materials with suitable properties (e.g., ceramics, composites, plastics, rubber, etc.).

The washer blocks 70 include an arcuate surface 130 and a second surface 135 shaped to receive the clamping member 65. The arcuate surface 130 is shaped to engage the outer surface 85 of the band 55 between the lobes 75. The arcuate surface 130 illustrated in FIG. 3 is semicircular. Alternative constructions may call for a different curve such as a half oval, or a parabolic shape. Still other constructions may call for the use of a flat surface instead of the arcuate surface described above.

The second surfaces 135 of the washer blocks 70 are flat to allow them to support the nut 100 and bolt 105 of the clamping member 65. The two washer blocks 70 are positioned on opposite sides of the band 55 between the lobes 75 with their arcuate surfaces 130 engaging the band 55. The two flat surfaces 135 remain parallel to one another, thereby allowing the bolt 105 to apply a more even force to the band 55.

The bolt 105 passes through the first washer block 70, the band 55, and the reaction blocks 60 before also passing through the second washer block 70. The nut 100 engages the bolt 105 and facilitates the tightening of the clamp 25. In another construction, the second washer block includes a threaded bore sized to receive the bolt, thereby eliminating the nut 100. In yet another construction, the first and second washer blocks both include threaded bores. However, the threads are of opposite hand (e.g., the first washer block has left hand threads and the second washer block has right hand threads). A threaded stud engages both washer blocks such that rotation in one direction (e.g., clockwise) pulls both washer blocks toward one another to facilitate clamping, while turning the stud in the opposite direction moves the washer blocks away from one another and loosens the clamp.

The exhaust clamp 25, when in the unclamped configuration, fits within a recess 140 provided on the outside pipes 35. The stub portions 50 of the inside pipes 45 extend into the outside pipe 35. The inside pipes 45 and outside pipes 35 in some constructions may include relief slots (not shown) that allow the pipes 45 to collapse slightly under the compressive force applied by the clamp 25.

Once the inside pipe 45 is positioned within the outside pipe 35 the exhaust clamp 25 is tightened to form a seal therebetween. As the clamping member 65 is tightened (e.g., the bolt 105 is turned) the lobes 75 are reduced in size and the narrow area between the lobes 75 becomes more narrow. As the narrow area narrows, the wedge surfaces 115 of the reaction blocks 60 cooperate with one another to apply a clamping force to the pipes 35, 45. The clamp 25 is tightened until each outside pipe 35 is compressed into sealing contact with the corresponding inside pipe 45.

FIG. 5 illustrates an alternate construction of the clamp 25A including another construction of the reaction blocks 60A and a band 55A formed from two pieces rather than one continuous piece. The reaction blocks 60A are truncated wedge-shaped members that include two arcuate side surfaces 150 shaped to engage the pipes 35 and a third surface 155 shaped to engage the inside surface 80 of the band 55A. In the construction of FIG. 5, the third surface 155 is flat. However, other constructions having a different band may employ an arcuate surface to facilitate proper engagement of the reaction blocks and the band. For example, reaction blocks for use with the band 55 illustrated in FIGS. 3-4 would preferably include an arcuate surface that abuts the inside surface 80 of the band 55.

The apex of each reaction block 60A opposite the third surface 155 is removed to provide a flat top surface 160. When the clamp 25 is tightened too far, the top surfaces 160 contact one another to prevent over tightening of the clamps 25 and resultant damage to the pipes 35, 45.

The arcuate surfaces 150 of the reaction blocks 60A cooperate with the inside surface 80 of the band 55A to define the two lobes 75. Each lobe 75 substantially surrounds one of the outer pipes 35 and provides an even clamping force when the clamp 25 is tightened.

The construction of FIG. 5 includes two U-shaped members 165 that attach to one another to define the band 55A. Other constructions employ two pieces that are W-shaped such that they attach to one another at the outermost point of each lobe 75 to define a complete band. In still other constructions, three or more pieces are assembled to define the band.

It should be noted that the reaction blocks 60 and reaction blocks 60A described herein included arcuate surfaces 110, 150 that engage the pipes 35 and assist in distributing the clamping force on the exhaust pipes 30 over a larger area. Spreading the clamping force reduces the chance of crushing the exhaust pipes 30 and/or denting the exhaust pipes 30 due to stress concentration applied by the clamp 25. Alternate constructions may employ reaction blocks that do not engage the pipes 35 but instead rely on the band 55 alone to provide the force necessary to clamp the pipes 35, 45.

It should be understood that the exhaust clamp 25 of the invention can be used to connect any two pipes in the manner just described. Therefore, the invention should not be limited to the specific connection illustrated herein, nor should the invention be limited to motorcycles 10.

Although the invention has been described in detail with reference to certain preferred embodiments, variations and modifications exist within the scope and spirit of the invention as described and defined in the following claims.

What is claimed is:

1. An exhaust pipe clamp for clamping at least two pipes, the clamp comprising:
 a band formed to at least partially surround each of the two pipes, the band defining an internal volume;
 a first reaction block and a second reaction block, the first and second reaction blocks interconnected with the band and disposed substantially within the internal volume; and
 a clamping member operable to reduce the internal volume of the band.

2. The exhaust pipe clamp of claim 1, wherein the band and reaction block cooperate to substantially surround and separate the pipes.

3. The exhaust pipe clamp of claim 1, wherein the first reaction block and the second reaction block cooperate such that each block applies a force that is substantially perpendicular to the clamping member to at least one of the at least two pipes.

4. The exhaust pipe clamp of claim 1, wherein each reaction block includes an arcuate surface and an angled surface opposite the arcuate surface, the angled surfaces in contact with one another and the arcuate surfaces cooperating with the band to define lobes, each lobe adapted to substantially surround one of the pipes, wherein operation of the clamping member moves the reaction blocks to reduce the internal volume.

5. The exhaust pipe clamp of claim 1, wherein each reaction block includes a flat top surface, the top surfaces engaging one another in a clamped position to prevent further movement of the clamp.

6. The exhaust pipe clamp of claim 1, wherein the clamping member comprises a bolt.

7. The exhaust pipe clamp of claim 1, wherein the band is formed as one continuous piece.

8. The exhaust pipe clamp of claim 1, wherein the band is figure-eight shaped.

9. An exhaust system comprising:
 a first outside pipe;
 a second outside pipe spaced a distance from the first pipe;
 a first inside pipe, a portion of which is at least partially disposed within the first outside pipe;
 a second inside pipe, a portion of which is at least partially disposed within the second outside pipe; and
 a pipe clamp including a band at least partially surrounding a portion of the first and second outside pipes, a first reaction block and a second reaction block, the first and second reaction blocks interconnected with the band and disposed between the first and second outside pipes, and a clamping member operable to move the first and second outside pipes into substantial sealing contact with the first and second inside pipes respectively.

10. The exhaust system of claim 9, wherein the band and reaction block substantially surround and separate the outside pipes.

11. The exhaust system of claim 9, wherein the first reaction block and the second reaction block cooperate such that each block applies a force that is substantially perpendicular to the clamping member to at least one of the first outside pipe and the second outside pipe.

12. The exhaust system of claim 9, wherein each reaction block includes an arcuate surface and an angled surface opposite the arcuate surface, the angled surfaces in contact with one another and the arcuate surfaces cooperating with the band to substantially define two lobes, wherein operation of the clamping member moves the reaction blocks and moves a portion of each outside pipe into sealing contact with the respective inside pipes.

13. The exhaust system of claim 9, wherein each reaction block includes a flat top surface, the top surfaces engaging one another in a clamped position to prevent further movement of the clamp.

14. The exhaust system of claim 9, wherein the clamping member comprises a bolt.

15. The exhaust system of claim 9, wherein the band is formed as one continuous piece.

16. The exhaust system of claim 9, wherein the band is figure-eight shaped.

17. A pipe clamp operable to provide a joint between first and second outside pipes and first and second inside pipes, the clamp comprising:
 a band formed to define a partial figure-eight shape at least partially surrounding the first and second outside pipes adjacent the joint;
 a first reaction block having an arcuate surface;
 a second reaction block having an arcuate surface, the first and second reaction blocks positioned within the band, the band and arcuate surfaces together substantially defining two arcuate lobes, each lobe having a size and substantially surrounding one of the first and second outside pipes adjacent the joint; and
 a clamping member defining a clamping axis and operable to move the first reaction block and the second reaction block perpendicular to the clamping axis and toward the first and second outside pipes respectively to reduce the size of the two arcuate lobes and to move the first and second outside pipes into substantial sealing contact with the first and second inside pipes respectively.

18. The pipe clamp of claim 17, wherein each reaction block includes an angled surface, the angled surfaces in contact with one another such that operation of the clamping member moves the reaction blocks to partially reduce the size of the two arcuate lobes.

19. The pipe clamp of claim 17, wherein each reaction block includes a flat top surface, the top surfaces engaging one another in a clamped position to prevent further movement of the clamp.

20. The pipe clamp of claim 17, wherein the clamping member comprises a bolt.

* * * * *